United States Patent

Won

[11] Patent Number: 5,898,536
[45] Date of Patent: Apr. 27, 1999

[54] AUTOMATIC DOOR OPENING MECHANISM FOR EJECTING CASSETTE TAPE OF VIDEO CASSETTE RECORDER

[75] Inventor: Jong-Ho Won, Suwon, Rep. of Korea

[73] Assignee: Samsung Electronics Co., Ltd., Kyungki-Do, Rep. of Korea

[21] Appl. No.: 08/998,610

[22] Filed: Dec. 29, 1997

[30] Foreign Application Priority Data

Feb. 28, 1997 [KR] Rep. of Korea ................. 97-6539

[51] Int. Cl.$^6$ .................................................. G11B 5/008
[52] U.S. Cl. .................................................. 360/96.5
[58] Field of Search .......................... 360/96.5, 84.85, 360/95

[56] References Cited

U.S. PATENT DOCUMENTS

| | | | |
|---|---|---|---|
| 5,191,494 | 3/1993 | Lee | 360/96.5 |
| 5,196,972 | 3/1993 | Matsumaru et al. | 360/94 |
| 5,357,385 | 10/1994 | Shimizu et al. | 360/96.5 |

Primary Examiner—John H. Wolff
Attorney, Agent, or Firm—Sughrue, Mion, Zinn, Macpeak & Seas, PLLC

[57] ABSTRACT

An automatic door opening mechanism for ejecting a video cassette tape of a video cassette recorder (VCR) includes a door mounted at both sides on door brackets in front of a cassette deck opening for inserting/ejecting a cassette tape so as to be opened upwardly and an actuator lever fixed on one end of an actuator shaft rotatably mounted on main frame. The actuator lever has a door locking part formed on one end and a button pressing part formed on the other end. A further door locking part is fixed on the other end of the actuator shaft. A retention arm is fixed on the actuator shaft in the middle thereof. The retention arm has a stopper tiltably mounted on its top. The stopper is vertically positioned under the cassette deck opening so as to be engaged with front and rear lower edges of the cassette tape and to be tilted inwardly by being engaged with the rear lower edge of the cassette tape when inserting the same through the opening. The stopper is returned to its vertical position after complete insertion of the cassette tape.

6 Claims, 8 Drawing Sheets

AUTOMATIC DOOR OPENING MECHANISM FOR EJECTING CASSETTE TAPE OF VIDEO CASSETTE RECORDER

BACKGROUND OF THE INVENTION

1. Field of the Invention

The present invention relates to a video cassette recorder (VCR), and more particularly to an automatic door opening mechanism for automatically ejecting video cassette tape.

2. Description of the Related Art

With conventional VCRs, a user can select various VCR functions such as power ON/OFF, playback, recording, stop, and the like, from a remote location by means of a remote control transmitter. In certain types of conventional VCRs, the user opens a VCR door manually and inserts a video cassette tape, and when ejecting the tape, also opens the VCR door manually and then actuates an ejector button.

The cassette tape inserting/ejecting mechanism of such conventional VCRs is described with reference to FIGS. 2–4 as follows. The cassette tape 20 is inserted and ejected through a cassette deck opening 11 in front of which a VCR door 21 is provided. Door brackets 22 are provided on both sides of the VCR door 21 for opening the door upwardly. The door brackets 22 are rotatably mounted on a hinge shaft 23 on which a torsion spring 24 is mounted, whereby one end of the torsion spring 24 is fixed on a main frame 10, and another end of the torsion spring 24 is fixed on the door bracket 22 on one side of the VCR door 21. One of the brackets 22 is provided with a hook pin 25 in the middle of the outer side thereof. The actuator lever 27, consisting of a door locking part forming a hook 29 and a button pressing part, is fixed on one side of an actuator shaft 26. Further another door locking part 36 forming a hook 37 is fixed on another side of the actuator shaft 26 so as to be locked by a hook pin 25 on the bracket 22 on the other side of the door 21. The actuator lever 27 rotates the actuator shaft 26, whereby the hook 29 is caught by the hook pin 25 on the door bracket 22.

As for the operation of the cassette tape inserting/ejecting mechanism of such a conventional video cassette recorder, when pressing the VCR door button (not shown) to insert cassette tape 20, the button pressing part of the actuator lever 27 is pushed inwardly so as to rotate the actuator shaft 26, whereby hook 29 is released from hook pin 25, and at the same time, the door brackets 22 are rotated upwardly by the restoring force of torsion spring 24, and thus the VCR door 21 is opened. Thereafter, cassette tape 20 can be inserted through cassette deck opening 11. When closing the VCR door 21 downwardly after inserting the cassette tape 20, the door brackets 22 are downwardly rotated on hinge shaft 23, whereby hook pin 25 pushes down the door locking part of actuator lever 27 by sliding down on the upper surface thereof, thereby being caught by hook 29 by the restoring force of a torsion spring 31.

In order to eject the cassette tape 20 from the cassette deck of the main frame 10, when pressing the VCR door button to push the button pressing part of the actuator lever 27 inwardly, the hook 29 of the door locking part is released from the hook pin 25, whereby the door brackets 22 are rotated upwardly by the torsion spring 24 so as to open the VCR door 21. Thereafter, when pressing the ejector button (not shown), the cassette tape 20 can be ejected from the cassette deck through cassette deck opening 11. After ejecting the cassette tape, when the user pushes down the VCR door 21, the hook pin 25 of door brackets 22 is caught by the hook 29 so as to close and lock the VCR door 21.

As described above, the conventional video cassette tape insert/ejecting mechanism has the drawback that the user must open the VCR door manually to insert and eject a cassette tape into/from the VCR.

SUMMARY OF THE INVENTION

Accordingly, it is an object of the present invention to provide an automatic door opening mechanism for ejecting a cassette tape from a VCR.

According to the present invention, an automatic door opening mechanism for ejecting a video cassette tape of a VCR comprises a door mounted at both sides on door brackets in front of a cassette deck opening for inserting/ejecting a cassette tape so as to be opened upwardly. The brackets are rotatably mounted on a bracket hinge shaft at both sides and each bracket has a hook pin formed in the middle on the outer side thereof. An actuator lever is fixed on one end of an actuator shaft rotatably mounted on a main frame, the actuator lever having a door locking part formed on one end apart from the actuator shaft and a button pressing part formed on the other end apart from said actuator shaft so as to cause the door locking part to be caught and locked by the hook pin provided on one of the door brackets.

A further door locking part is fixed on the other end of the actuator shaft so as to cause the door locking part to be caught and locked by the hook pin provided on the other of the door brackets, and a retention arm is fixed on the actuator shaft in the middle thereof, the arm having a stopper tiltably mounted on the top thereof, wherein the stopper is vertically positioned under a cassette deck opening so as to be engaged with front and rear lower edges of the cassette tape and to be tilted inwardly by being engaged with the rear lower edge of the cassette tape when inserting the same through the opening, the stopper being returned to its vertical position after complete insertion of the cassette tape, and when ejecting the cassette tape, the same pushes the stopper outwardly so as to rotate the actuator shaft together with the actuator lever, thereby releasing hook pins of both door brackets from respective hooks of door locking parts, so that the door brackets are rotated upwardly and thus the door can be automatically opened.

The present invention will now be described more specifically with reference to the drawings attached only by way of example. It is to be noted that like reference numerals and characters used in the accompanying drawings refer to like constituent elements.

DETAILED DESCRIPTION OF THE PREFERRED EMBODIMENT

Figure 1:
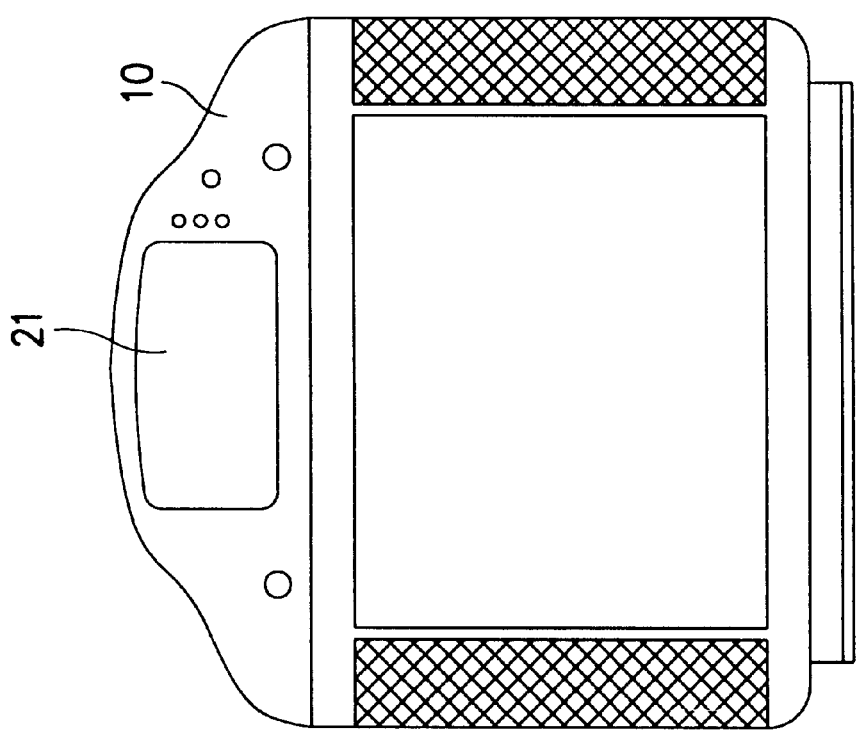
FIG. 1 is a front view of a videovision having a VCR.
Figure 2:
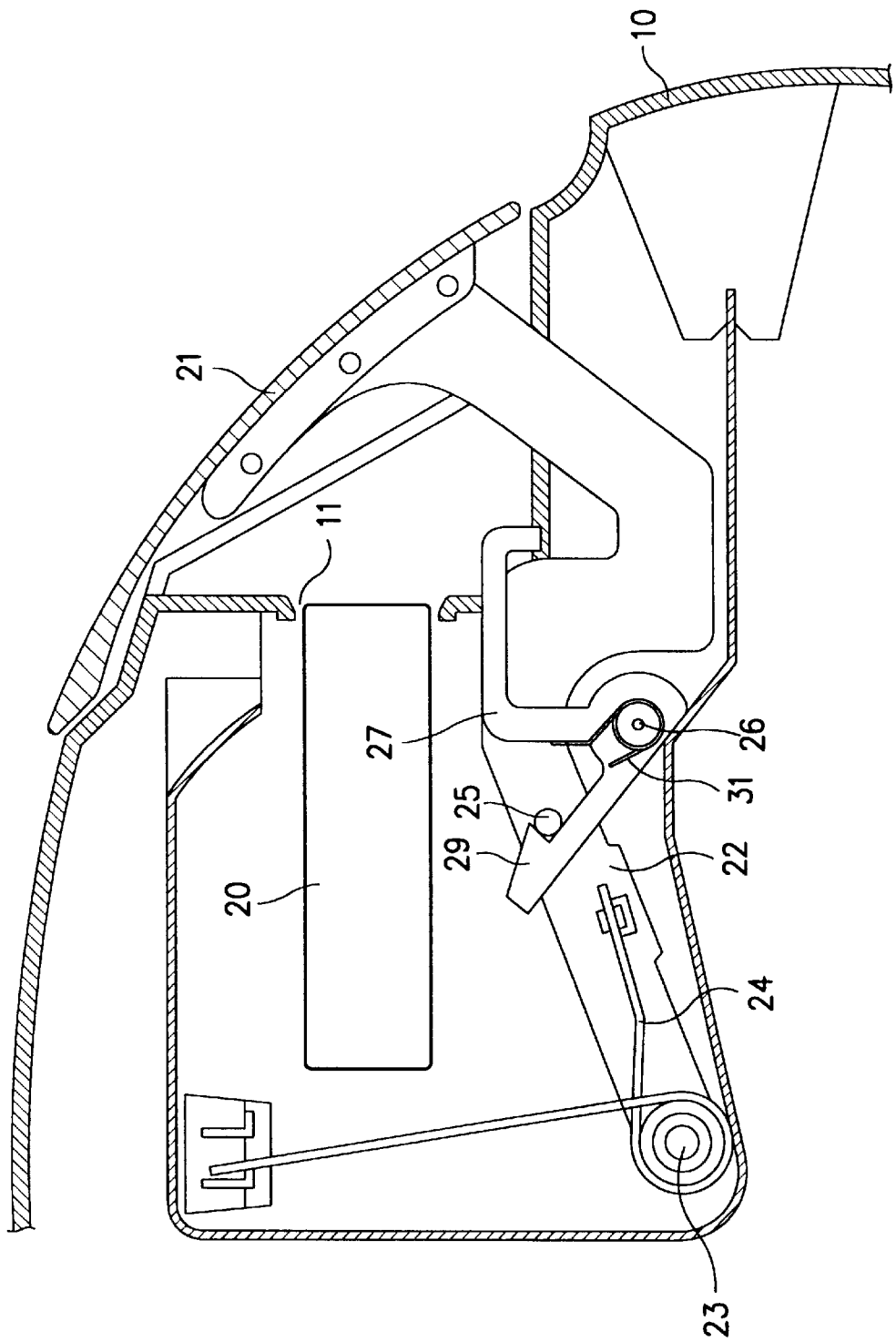
FIG. 2 is a sectional side view illustrating the construction of the tape inserting/ejecting mechanism of a conventional VCR when the door is closed.
Figure 3:
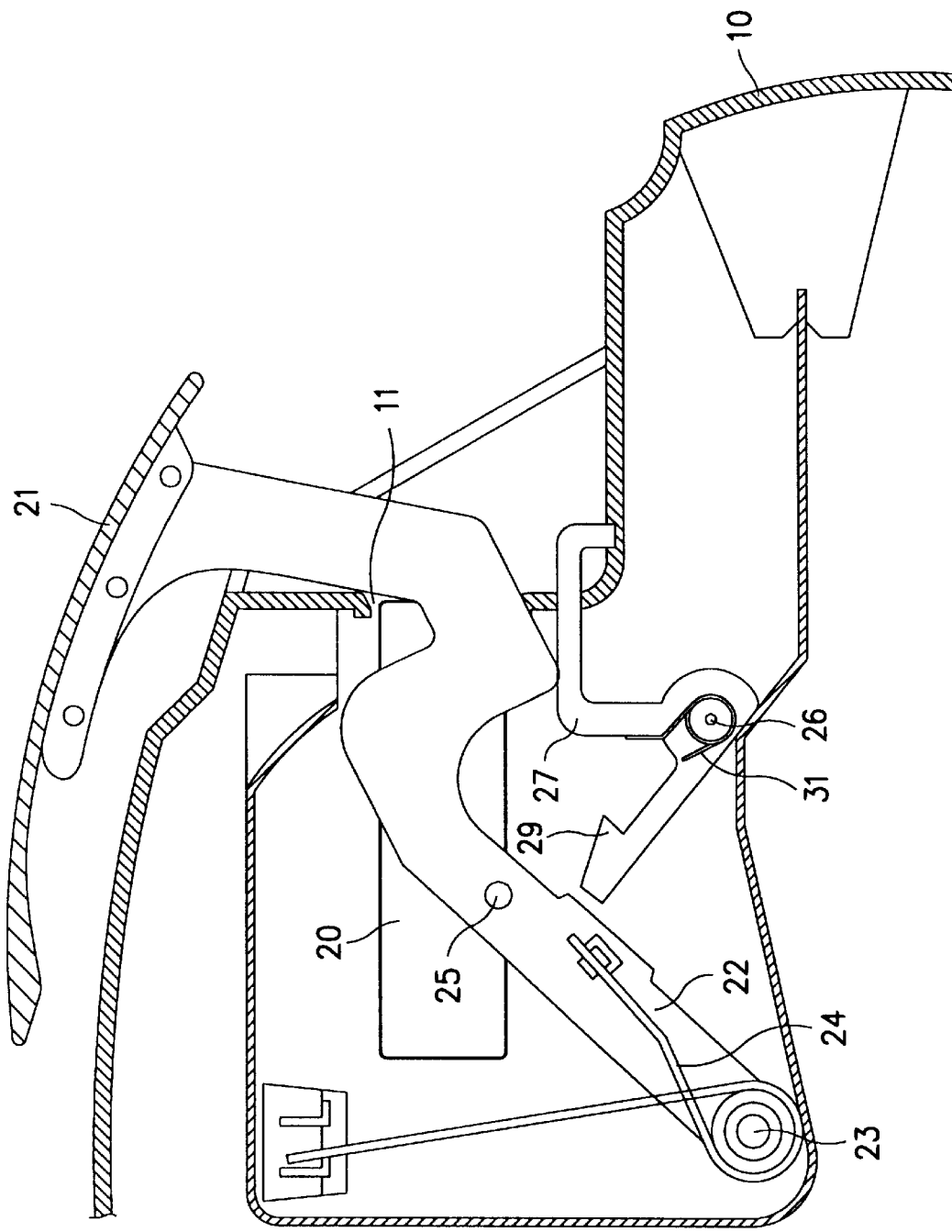
FIG. 3 is a sectional side view illustrating the construction of the tape inserting/ejecting mechanism of a conventional VCR when the door is opened.
Figure 4:
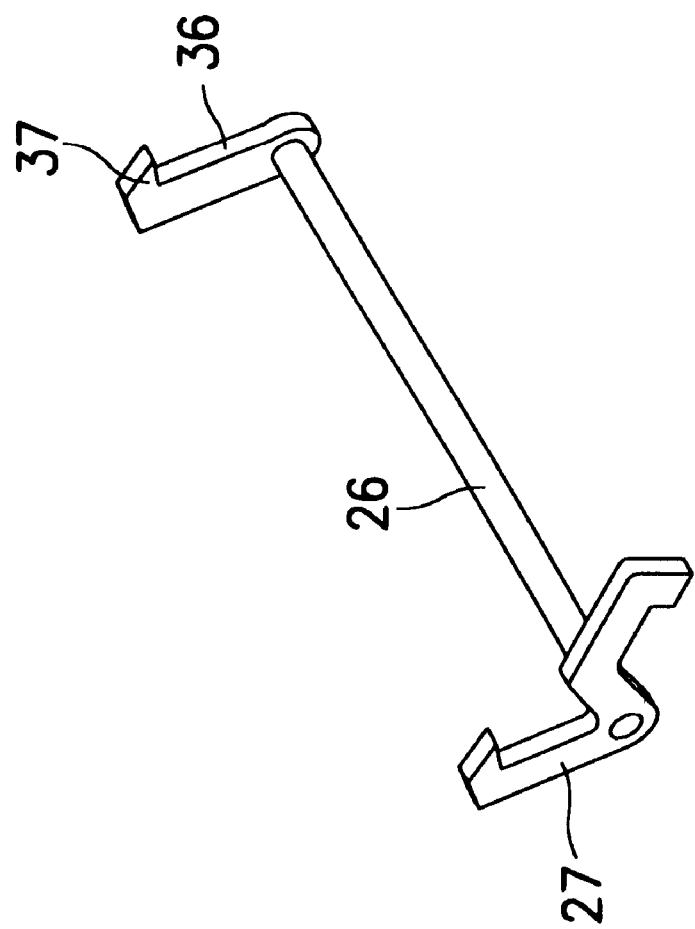
FIG. 4 is a perspective view of the actuator lever for locking the door bracket of a conventional VCR.
Figure 5:
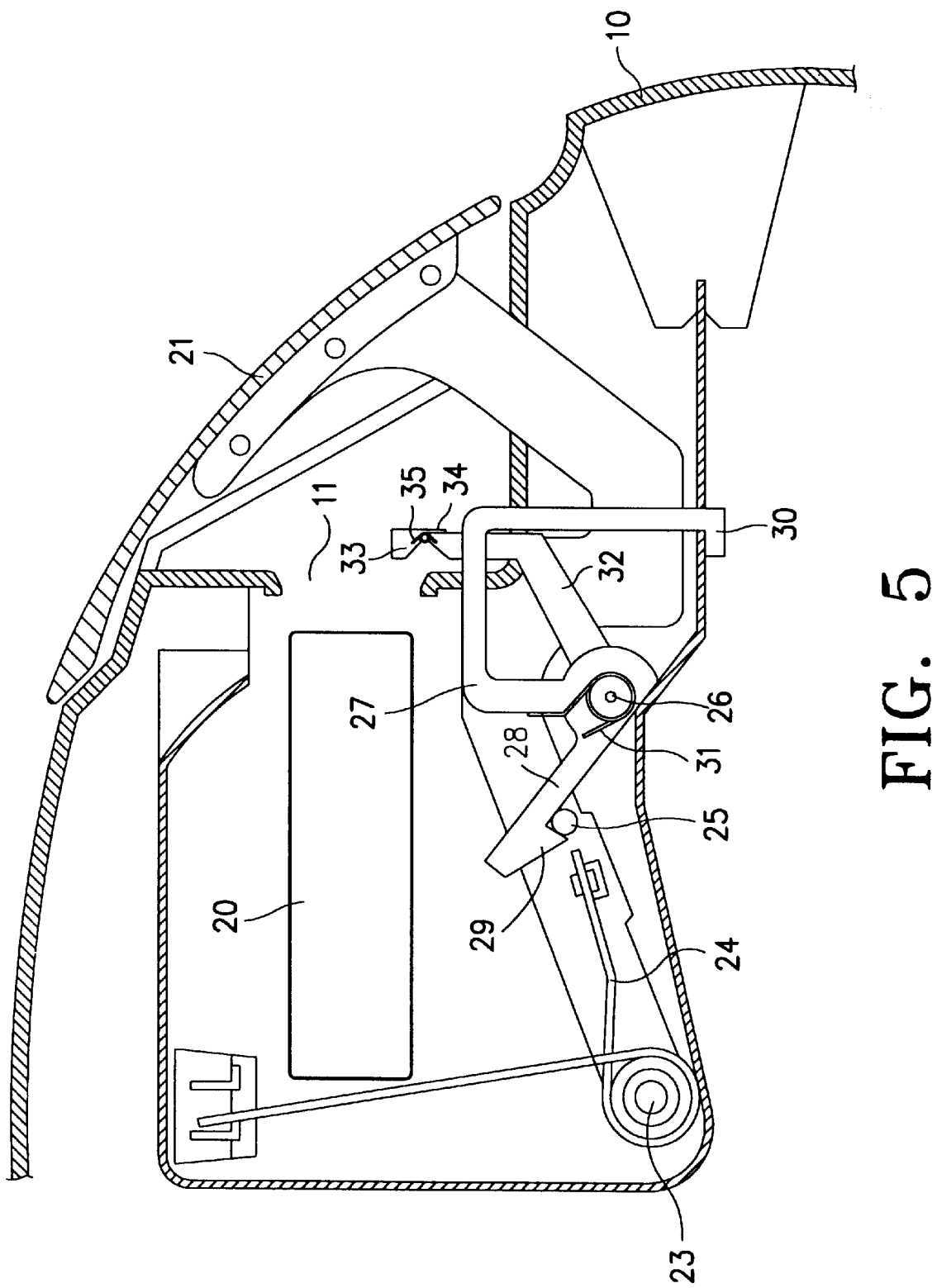
FIG. 5 is a sectional side view illustrating the construction of automatic door opening mechanism for ejecting video cassette tape of VCR according to an embodiment of the present invention.
Figure 6:
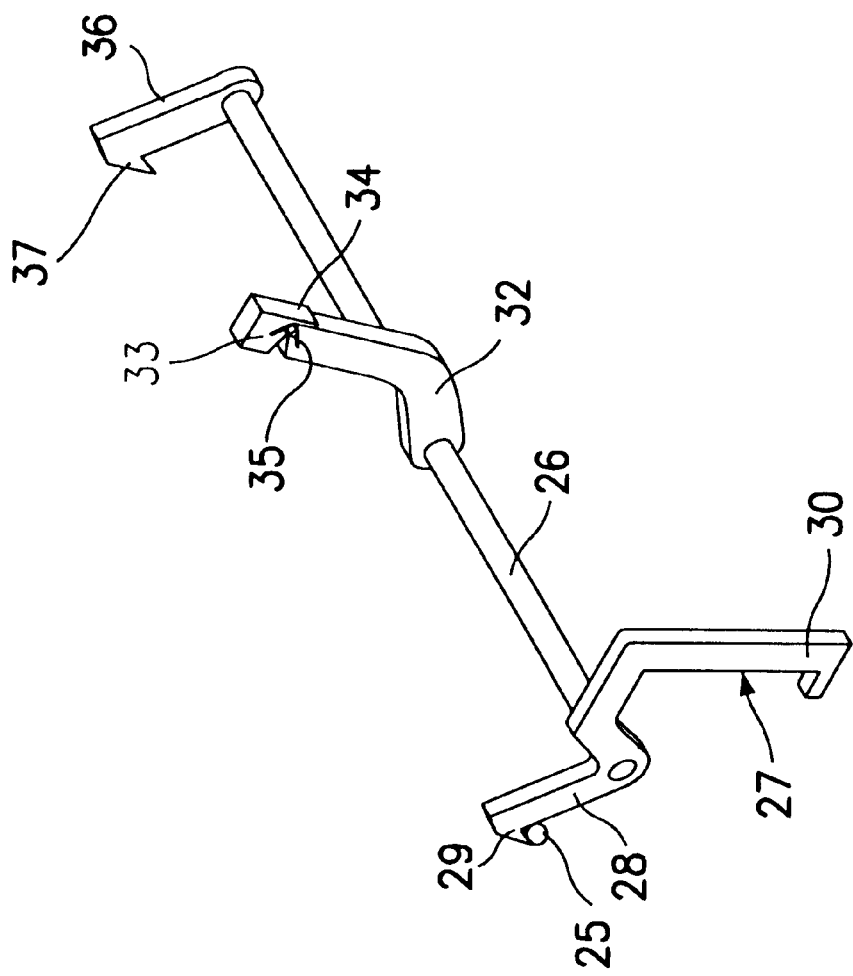
FIG. 6 is a perspective view of the actuator lever for locking the door bracket according to the embodiment of the present invention.
Figure 7:
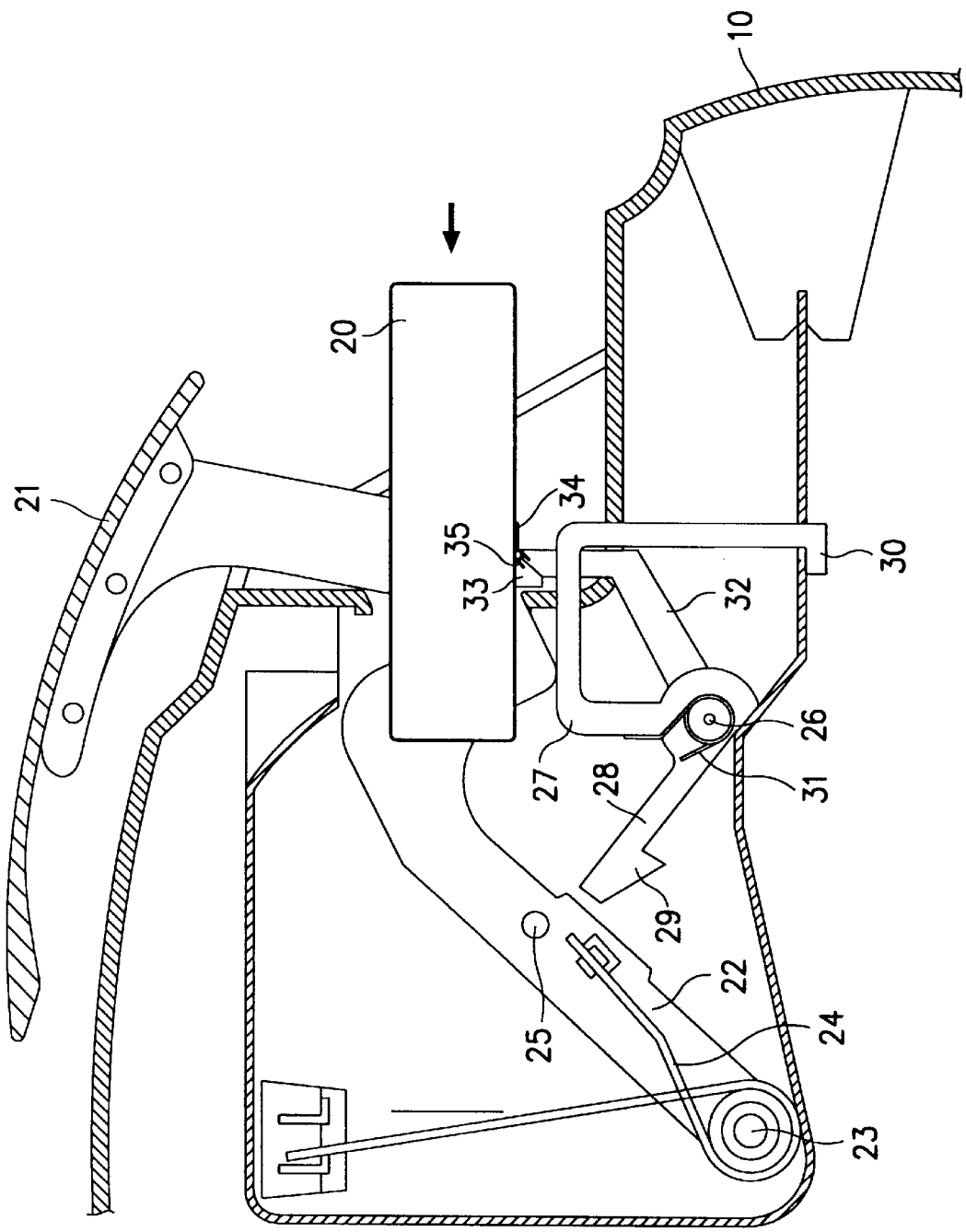
FIG. 7 is a sectional side view illustrating the operating state of the actuator lever when inserting video cassette tape according to the embodiment of the present invention.
Figure 8:
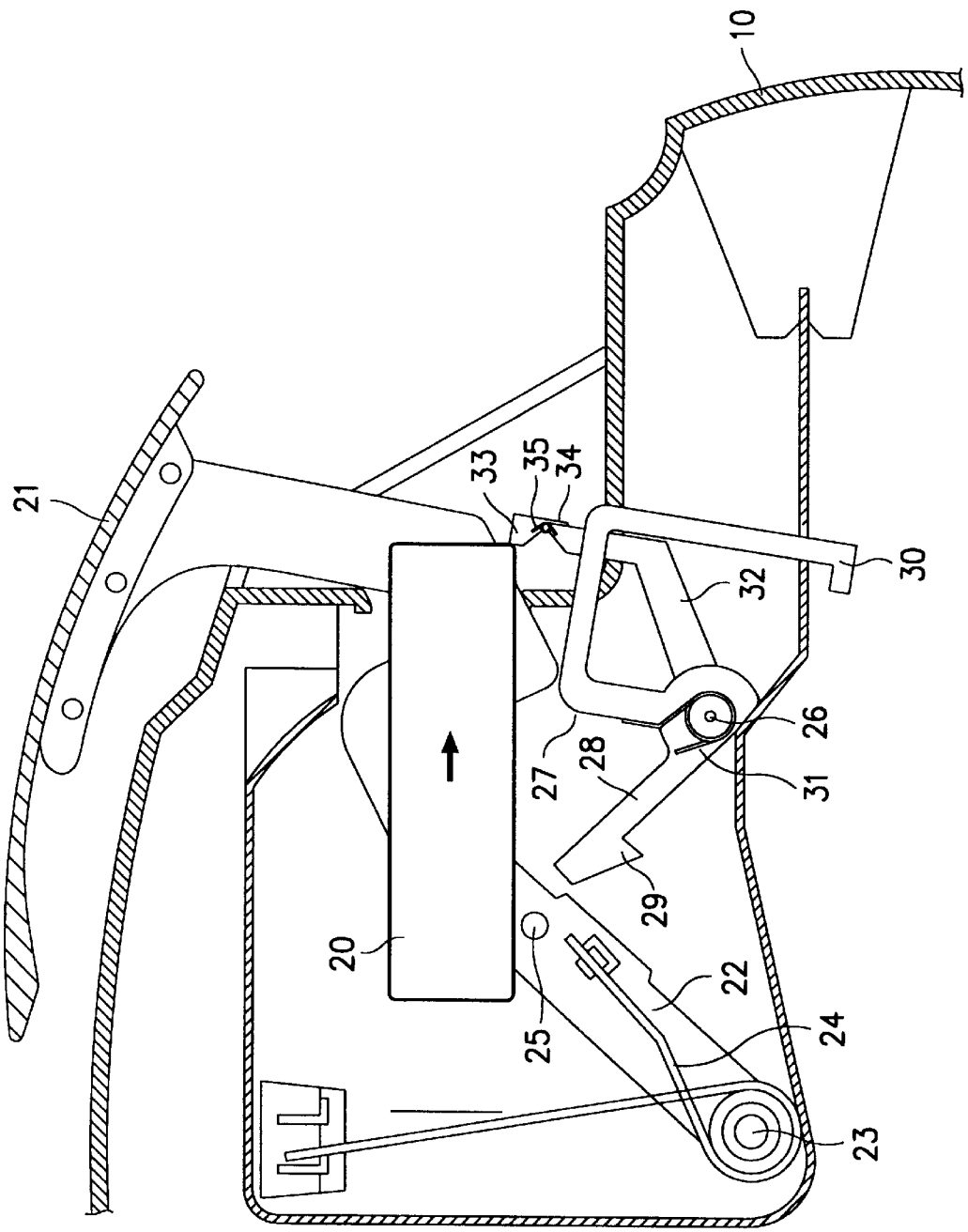
FIG. 8 is a sectional side view illustrating automatic door opening operation of VCR when ejecting video cassette tape according to the embodiment of the present invention.

Referring to FIGS. 5–8, the VCR door 21 is provided in front of the cassette deck opening 11 by mounting door brackets 22 on both sides thereof which are rotatably mounted on a bracket hinge shaft 23, and mounting a torsion spring 24 on one side of the above bracket hinge shaft 23, whereby one end of the torsion spring 24 is fixed on the main frame 10 and another end thereof is fixed on the door bracket 22, so that the VCR door 21 is opened upwardly by the restoring force of the torsion spring 24.

An actuator lever 27 having a button pressing part 30 on one end, and a door locking part 28, on the other end, with a hook 29 being caught by a hook pin 25 formed outwardly on the middle of one side of the door bracket 22 is fixed on the actuator shaft 26 provided on the main frame 10. A further door locking part 36 having a hook 37 (shown in FIG. 6) being caught by hook pin 25 formed on the other door bracket 22 is fixed on the other side of the actuator shaft 26. A retention arm 32 having a stopper 33 on top thereof is fixed on the center of the actuator shaft 26.

The actuator lever 27 is shaped so that one end thereof forms a door locking part 28 having a hook 29 and the other end thereof forms a button pressing part 30 having a bended tip. The above stopper 33 of the retention arm 32 is tiltably mounted on the top of the retention arm 32 by means of a shaft and provided with a torsion spring 35 so that the stopper 33 can be returned to its original vertical position after being tilted inwardly by the front lower edge of the cassette when inserting the cassette tape 20. The above stopper 33 is further provided at the lower part thereof with a stopper rib 34 formed like a tail so that when ejecting the cassette tape 20, the stopper 33 is pushed together with the retention arm 32 hitched by the stopper rib 34 outwardly in the direction of the VCR door 21. The actuator shaft 26 and thus the actuator lever 27 are simultaneously rotated so as to release the hook pins 25, of the door brackets 22 from hooks 29, 37 of the door locking parts 28, 36, so that the door brackets 22 are rotated upwardly by the torsion spring 24 to automatically open the VCR door 21.

As for the overall operation of the automatic door opening mechanism of the present invention, when the door button is pressed in order to insert the cassette tape 20 into the cassette deck opening 11 the button pressing part 30 is pressed of the actuator lever 27 fixed on actuator shaft 26, and the actuator shaft 26 is rotated, thereby releasing the hooks 29, 37 of door locking parts 28, 36 from the hook pins 25 of the door brackets. 22. Then the door brackets 22 are rotated by the restoring force of the torsion spring 24 of the bracket hinge shaft 23 to open the VCR door 21. Thereupon, when inserting the cassette tape 20 into the cassette deck opening 11, the front lower edge of the cassette engages and pushes the stopper 33 of the retention arm 32, whereby the stopper 33 is tilted inwardly, allowing the cassette tape 20 to be completely inserted through the cassette deck opening 11, and then returned to its original vertical position by the torsion spring 35, the one end of which is fixed on retention arm 32 and the other end of which is fixed on stopper 33, respectively.

Thereafter, when the user closes the VCR door 21, the door brackets 22 are pressed down forcibly against the torsion moment of the torsion spring 24, whereby the hook pins 25 of the door brackets 22 push up the door locking parts 28, 36 outwardly by sliding down along the oblique surface of the hooks 29, 37 to engage with the hooks 29, 37 to be locked therewith by the torsion spring 31.

When pressing the ejector button (not shown in drawings) in order to eject the cassette tape 20 from the cassette deck, the cassette tape 20 is ejected through the cassette deck opening 11 and the stopper 33 of the retention arm 32 is pushed outwardly by the rear lower edge of cassette tape 20, whereby the retention arm 32 is rotated outwardly together with the actuator shaft 26 which simultaneously rotates the actuator lever 27 and the door locking part 36 both fixed thereon. This movement releases both door locking parts 28, 36 from the respective hook pins 25 of the door brackets 22, and at the same time, the door brackets 22 are also rotated upwardly by the torsion spring 24, thereby opening the VCR door 21. Thereafter, the cassette tape 20 can be ejected out of the cassette deck opening 11, and when closing the VCR door 21 by pressing the same downwardly, the hook pins 25 of the door brackets 22 push the door locking parts 28, 36 outwardly by sliding down along the oblique surface of the hooks 29, 37 to engage with the hooks 29, 37 to be locked therewith by the torsion spring 31.

As described above, the present invention has the advantage that the VCR door can be automatically opened when ejecting cassette tape 20 out of the cassette deck, which can improve the quality and reliability of VCR products substantially.

What is claimed is:

1. An automatic door opening mechanism for ejecting a video cassette tape of a video cassette recorder (VCR) comprising:

a door mounted at both sides on door brackets in front of a cassette deck opening for inserting/ejecting a cassette tape so that said door opens upwardly, said brackets being rotatably mounted on both sides of a bracket hinge shaft and each of said brackets having a hook pin formed in the middle of an outer side thereof;

an actuator lever fixed on one end of an actuator shaft rotatably mounted on a main frame, said actuator lever having a first door locking part formed on one end apart from said actuator shaft and a button pressing part formed on the other end apart from said actuator shaft, whereby said first door locking part is caught and locked by said hook pin provided on one of said door brackets;

a second door locking part fixed on the other end of said actuator shaft, whereby said second door locking part is caught and locked by said hook pin provided on the other of said door brackets; and a retention arm fixed on said actuator shaft in the middle thereof, said arm having a stopper tiltably mounted on the top thereof, wherein said stopper is vertically positioned under said cassette deck opening so as to be engaged with front and rear lower edges of said cassette tape and to be tilted inwardly by being engaged with said rear lower edge of said cassette tape when inserting said cassette tape through said opening, said stopper being returned to its vertical position after complete insertion of said cassette tape, and said cassette tape pushes said stopper outwardly when being ejected, so as to rotate said actuator shaft together with said actuator lever, thereby releasing said hook pins of said door brackets from hooks of said door locking parts, so that said door brackets are rotated upwardly and said door is automatically opened.

2. An automatic door opening mechanism for ejecting a video cassette tape of a VCR comprising:

a door mounted at both sides on door brackets in front of a cassette deck opening for inserting/ejecting a cassette tape so as to be opened upwardly, said brackets being rotatably mounted on both sides of a bracket hinge shaft and each of said brackets having a hook pin formed in the middle of an outer side thereof;

a torsion spring mounted on said bracket hinge shaft, whereby one end of said torsion spring is fixed on a main frame and the other end thereof is fixed on one of said door brackets;

an actuator lever fixed on one end of an actuator shaft rotatably mounted on said main frame, said actuator lever having a first door locking part formed on one end apart from said actuator shaft and a button pressing part formed on an other end apart from said actuator shaft, whereby said door locking part is caught and locked by said hook pin provided on one of said door brackets;

a second door locking part fixed on an other end of said actuator shaft, whereby said second door locking part is caught and locked by said hook pin provided on the other of said door brackets; and a retention arm fixed on a middle portion of said actuator shaft, said retention arm having a stopper tiltably mounted on the top thereof, wherein said stopper is tilted inwardly by being engaged with a rear lower edge of said cassette tape when inserting said cassette tape through said opening, and when ejecting said cassette tape, said cassette tape pushes said stopper outwardly so as to rotate said actuator shaft together with said actuator lever, thereby releasing said hook pins of said door brackets from said hooks of said first and second door locking parts, so that said door brackets are rotated upwardly and said door is automatically opened.

3. An automatic door opening mechanism for ejecting a video cassette tape of a VCR as claimed in claim 2, wherein said actuator lever is shaped so that an upper end thereof forms said first door locking part having the hook and a lower end thereof forms said button pressing part having a bended tip.

4. An automatic door opening mechanism for ejecting a video cassette tape of a VCR as claimed in claim 2, wherein said stopper is provided with a torsion spring, so that said stopper is tilted inwardly when inserting said cassette tape and returned to an original vertical position by a restoring force of said torsion spring after complete insertion of said cassette tape.

5. An automatic door opening mechanism for ejecting a video cassette tape of a VCR as claimed in claim 2, wherein a stopper rib is provided at a lower part of said stopper to prevent said stopper from being tilted outwardly in reverse direction when said cassette pushes said stopper outwardly during ejection.

6. An automatic door opening mechanism for ejecting a video cassette tape of a VCR as claimed in claim 2, wherein said actuator shaft is provided with a torsion spring so that said actuator lever returns to an original position.

* * * * *